US008028999B2

United States Patent
Wolf et al.

(10) Patent No.: US 8,028,999 B2
(45) Date of Patent: Oct. 4, 2011

(54) AXLE BOOT

(75) Inventors: Joachim Wolf, Weinheim (DE); Andreas Kammann, Heidelberg (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 12/590,351

(22) Filed: Nov. 6, 2009

(65) Prior Publication Data

US 2010/0084826 A1    Apr. 8, 2010

Related U.S. Application Data

(63) Continuation of application No. 10/627,080, filed on Jul. 25, 2003, now abandoned.

(30) Foreign Application Priority Data

Jul. 26, 2002 (DE) .................................. 102 34 284
Aug. 21, 2002 (DE) .................................. 102 39 169

(51) Int. Cl.
*F16J 15/52* (2006.01)
*F16J 3/04* (2006.01)
*F16D 3/84* (2006.01)

(52) U.S. Cl. ........ 277/634; 277/635; 277/636; 464/111; 464/173; 464/175

(58) Field of Classification Search .......... 277/634–636; 464/111, 173, 175
See application file for complete search history.

(56) References Cited

U.S. PATENT DOCUMENTS

| 4,280,340 A | 7/1981 | Goguet ........................ 464/124 |
| 4,299,400 A | 11/1981 | Tsuru ............................ 277/636 |
| 4,795,404 A | 1/1989 | Sutton et al. .................. 464/111 |
| 4,936,811 A | 6/1990 | Baker ............................ 464/175 |
| 5,026,323 A | 6/1991 | Fukumura et al. ............ 464/175 |
| 6,089,574 A | 7/2000 | Sadr et al. ..................... 277/636 |
| 6,547,669 B1 | 4/2003 | Neviani ........................ 464/175 |
| 6,672,596 B2 | 1/2004 | Devers .......................... 464/175 |
| 7,347,787 B2* | 3/2008 | Ohshita et al. ................ 464/173 |
| 7,488,259 B2* | 2/2009 | Sueoka et al. ................ 464/175 |
| 7,530,575 B2* | 5/2009 | Ota ................................ 277/635 |
| 7,585,227 B2* | 9/2009 | Ohshita ........................ 464/175 |
| 7,607,986 B2* | 10/2009 | Deisinger ..................... 464/175 |
| 2004/0056434 A1* | 3/2004 | Wolf et al. .................... 277/634 |

FOREIGN PATENT DOCUMENTS

| EP | 0389099 | 9/1990 |
| EP | 0924450 | 6/1998 |
| EP | 0915264 | 5/1999 |
| JP | 55-60726 | 10/1978 |
| JP | 56-62464 | 10/1982 |
| JP | 61-54523 | 4/1986 |
| JP | H2-278020 | 11/1990 |

* cited by examiner

*Primary Examiner* — Alison Pickard
(74) *Attorney, Agent, or Firm* — Pearl Cohen Zedek Latzer, LLP (57) ABSTRACT

An axle boot for joint sealing, in particular on the drive train of motor vehicles, includes a substantially axisymmetric bellows, which is designed as a single piece with a connecting collar. The connecting collar has a plurality of indentations projecting towards the inside that are adapted to radial recesses in the external contour of the joint housing. To the outside of the connecting collar are attached compensating pieces that complete the external contour, forming a cylindrical circumferential surface on which a clamp is located.

19 Claims, 7 Drawing Sheets

AXLE BOOT

CROSS REFERENCE TO RELATED APPLICATIONS

This is a continuation of U.S. patent application Ser. No. 10/627,080, filed on Jul. 25, 2003, which claims priority to German patent application no. 102 34 2894.9-12, filed on Jul. 26, 2002 and to German patent application no. 102 39 169.6-12, filed on Aug. 21, 2002. The subject matter of both of the aforesaid German patent applications is hereby incorporated by reference herein.

BACKGROUND

The present invention relates to an axle boot for joint sealing, in particular on the drive train of motor vehicles, that includes a substantially axisymmetric bellows, which is designed as a single piece with a connecting collar, and compensating pieces attached to and distributed over the connecting collar for the purpose of adapting to an external contour of a joint housing, a contour that includes a plurality of radial recesses.

Axle boots of this type are typically used to seal off joints in the drive train of motor vehicles, joints whose joint housing has an external contour that includes a plurality of radial recesses. Since three radial recesses are usually provided on the circumference, the result is a three-lobe external contour that is also described as trilobe-shaped, which is at the same time the interface to the axle boot, which is usually fastened by clamps. The sealing of the joint area is necessary in order to keep dirt and moisture away from the joint and to preserve the grease filling in the joint.

For the purpose of adapting the connecting collar of the bellows on to the non-axisymmetric external contour of the joint housing, it is known in the case of axle boots manufactured from elastomers by the injection-molding method to provide enlargements in the connecting collar that act as compensating pieces and compensate for the radius differences of the external contour of the joint housing so that a circular clamp can be used for clamping purposes.

In this case, pronounced undercuts are formed on the inside at the transition from the connecting collar to the bellows. The elastomer material that is used makes easy demolding possible, in spite of these pronounced undercuts, since it has sufficient reversible extensibility. This manufacturing method, however, is no longer possible if the axle boot is to be manufactured from a thermoplastic copolyester (TPE). A molding having such pronounced undercuts would be destroyed during demolding since it does not withstand the necessary extensions. In addition, the formation of great wall thickness differences in thermoplastic moldings requires long cooling times in the mold and results in sink marks or the formation of voids.

In order to avoid these difficulties, the connecting collar for a known axle boot (European Patent Application EP 0 924 450 A2) is cylindrical in design. An annular insert that is surrounded by the connecting collar is provided for the purpose of adapting to the joint housing's external contour, which is provided with radial recesses. This insert has a plurality of projections that protrude into the inside and fit into the radial recesses of the joint housing. The axle boot can be manufactured relatively easily because the connecting collar, in particular, has a constant wall thickness and no undercuts are formed that would be a hindrance during demolding. Disadvantageous, however, is the fact that the bellows or at least its connecting collar must be reheated in a second manufacturing step in order to create the bond with the insert. This has a disadvantageous effect on strength and geometry due to molecule rearrangement. In addition, there is another joint between the connecting collar and the insert that has no useful function but must also be designed so that it seals.

That type of joint is avoided in an axle boot described in European Patent Application EP 0 915 264 A2, through the formation, in a single piece, of compensating pieces on the inside of the connecting collar that fit into the radial recesses in the joint housing. The known axle boot is manufactured in a combined injection blow molding process that makes an automated manufacturing run possible. The compensating pieces must be reinforced by radial webs in order to transfer the clamping force for the purpose of connecting the axle boot to the joint housing. The necessary optimization of wall thickness distribution makes any changes in the compensating pieces complicated and expensive because the injection-molding mold has to be changed for this purpose.

SUMMARY OF THE INVENTION

An object of the present invention is to provide an axle boot of the kind cited at the beginning of this document such that it may be manufactured from TPE, taking into account the material-specific boundary conditions. An additional or alternative object is to avoid the technical difficulties of the known designs.

The present invention provides an axle boot for joint sealing, in particular on the drive train of motor vehicles, that includes a substantially axisymmetric bellows designed as a single piece with a connecting collar, and comprising compensating pieces attached to and distributed on the connecting collar for the purpose of adapting to an external contour of a joint housing, a contour that includes a plurality of radial recesses. The connecting collar (5) has a plurality of indentations (5a) projecting towards the inside that are adapted to the radial recesses (2) of the external contour of the joint housing (1), and the compensating pieces (6, 6') are attached to the outside of the connecting collar (5) and complete its outside contour, forming a cylindrical circumferential surface.

Between the axle boot and the joint housing there is only one single joint that needs to be sealed. Since the contact surfaces between the connecting collar and the compensating pieces lie on the outside, no sealing is required there.

The connecting collar that forms the interface between the axle boot and the joint housing is formed immediately during the first manufacturing step. Because of the trilobe-shaped contour of the connecting collar, an unnecessary additional sealing surface is avoided. The previous molds for axle boots made of thermoplastic copolyester in which the connecting collar has a radially symmetric design may be used, after a slight change, for manufacturing the axle boots according to the present invention, which have a non-axisymmetric connecting collar. As was already the case with the conventional method, wall thickness differences may be minimized by using the available machine technology.

Nevertheless, the use of a circular clamp is possible, as before, because the spacings between the connecting collar and the outside contour are bridged by the compensating pieces attached to the outside. The compensating pieces transfer the clamping force from the clamp to the connecting collar and thus to the joint being sealed. A tight bond between the compensating pieces and the connecting collar is not required.

In accordance with one embodiment of the present invention, it is provided that the circumferential length of each compensating piece corresponds approximately to the circumferential length of the associated radial recess. The compensating pieces include, in this case, a plurality of components that are separated from one another and located at a circumferential distance from one another.

In order to reduce the assembly expenditure in automotive manufacturing, all compensating pieces may be designed such that they are connected in the form of a single-piece component extending around the entire circumference of the connecting collar. This also brings about a reduction in diameter.

Preferentially, the compensating pieces may be connected to a circumferential clamp for the connecting collar. The compensating pieces may also be designed together with the clamp as an integrated multi-component unit. All these measures serve essentially to simplify assembly.

BRIEF-DESCRIPTION OF THE DRAWINGS

Exemplary embodiments of the invention are explained in greater detail in the following and are shown in the drawings, in which.

DETAILED DESCRIPTION

Figure 1:
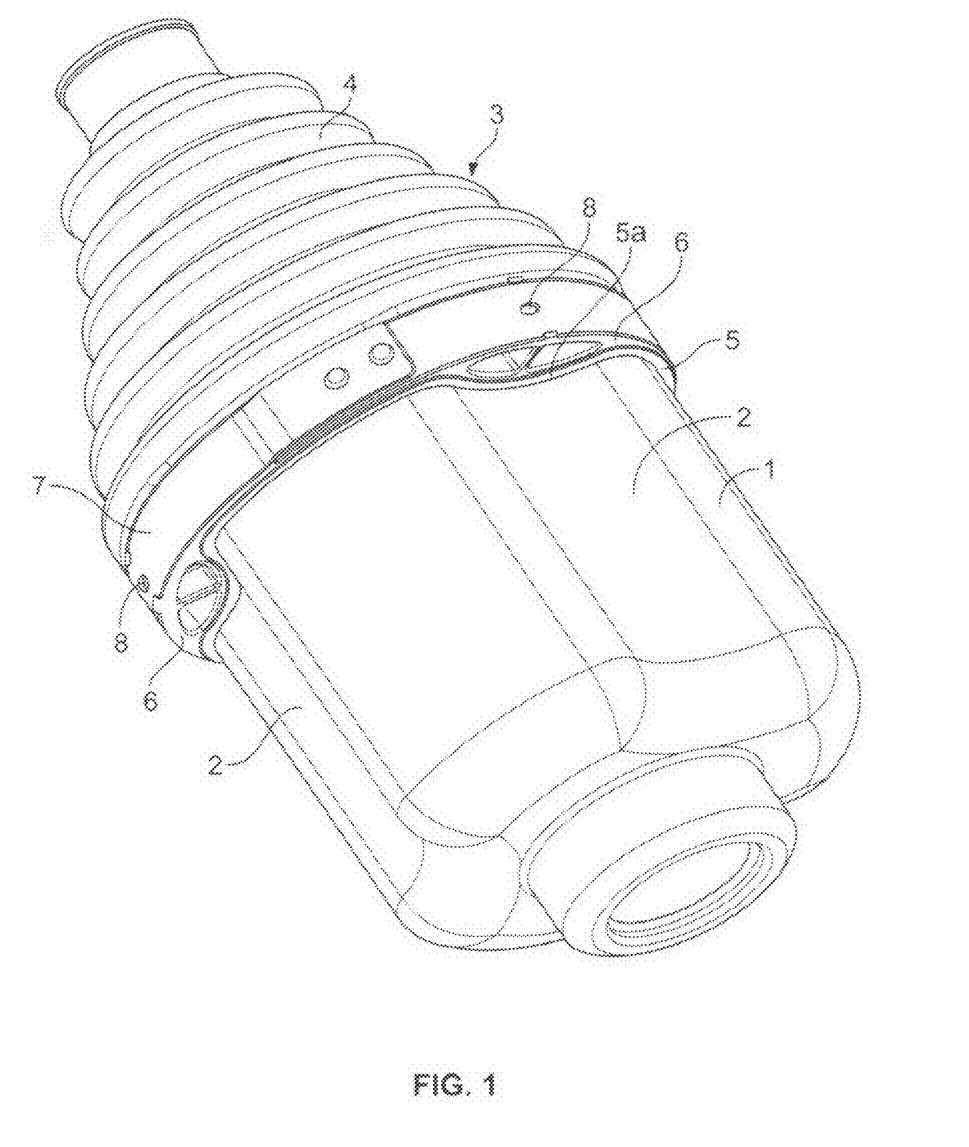
FIG. 1 shows a joint housing with an attached axle boot in three-dimensional representation.
Figure 2:
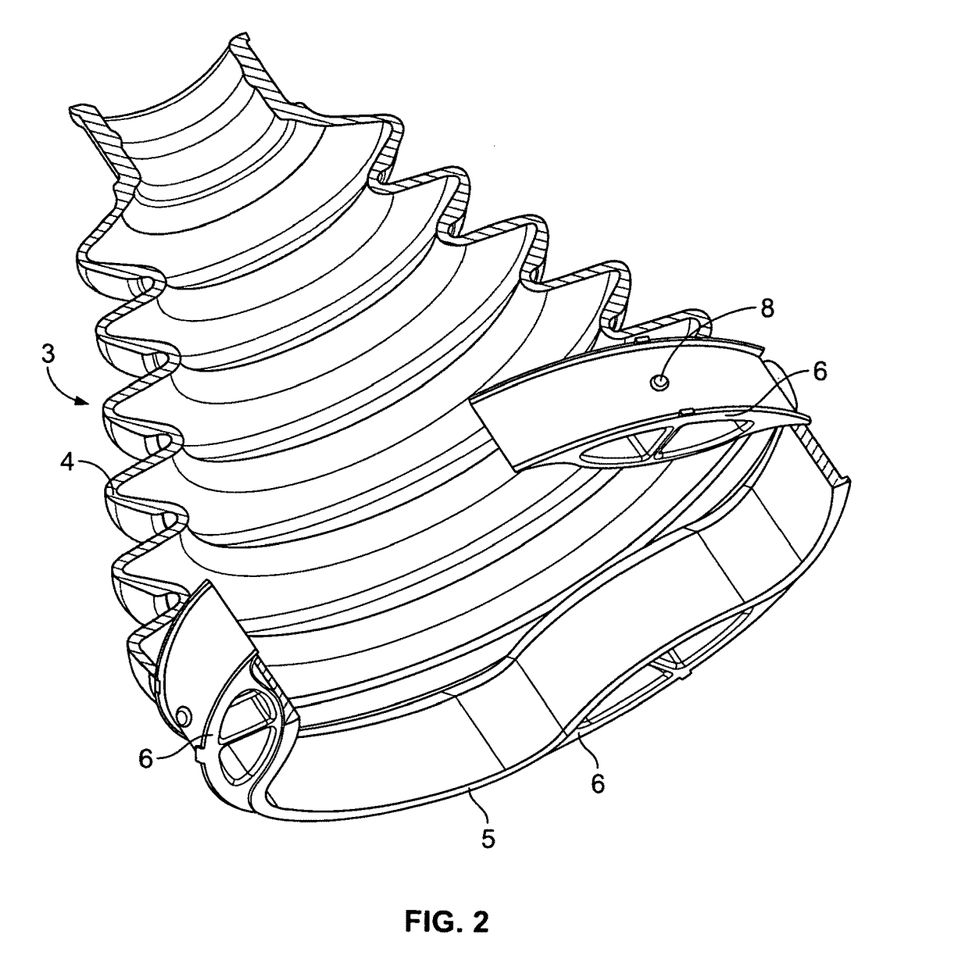
FIG. 2 shows the axle boot of FIG. 1 along with the associated compensating pieces in partial cutaway representation.
Figure 3:
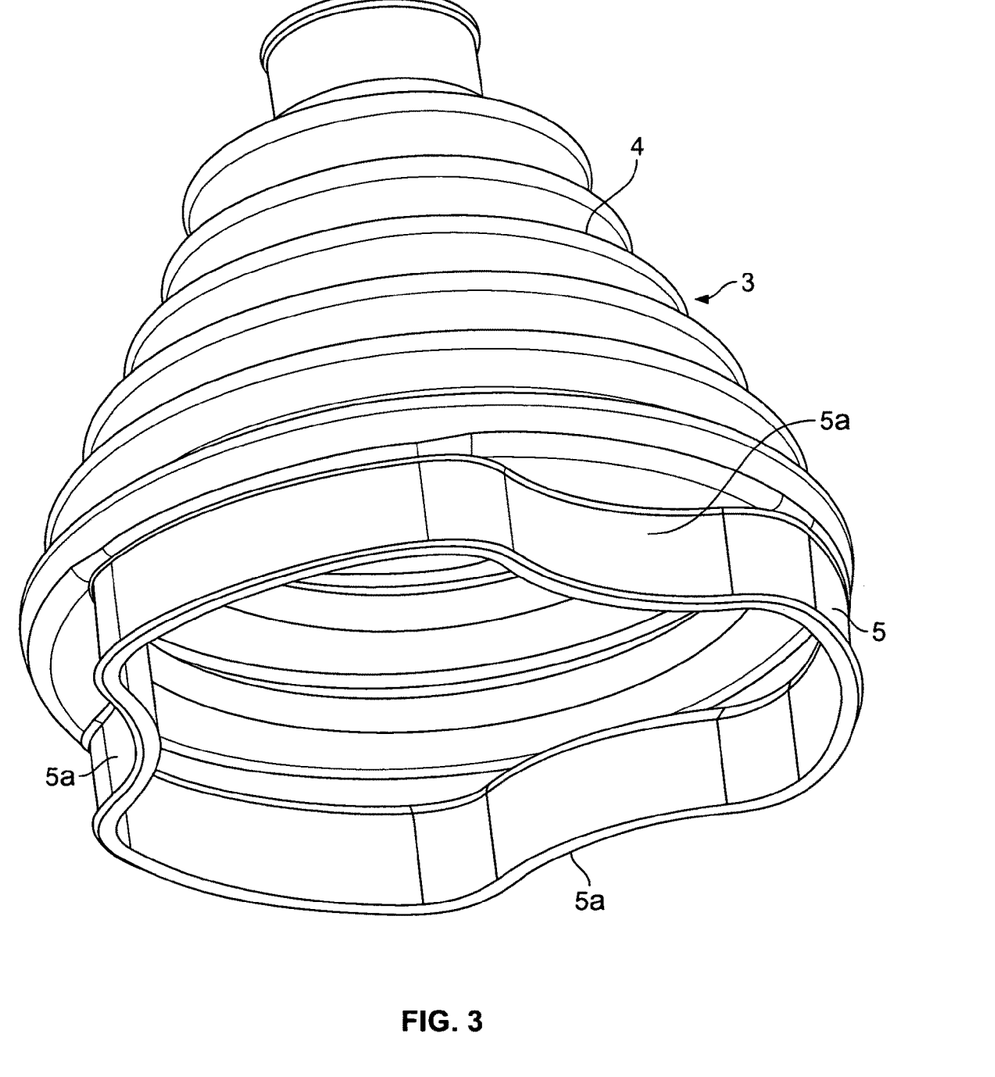
FIG. 3 shows the axle boot of FIGS. 1 and 2 in three-dimensional representation.
Figure 4:
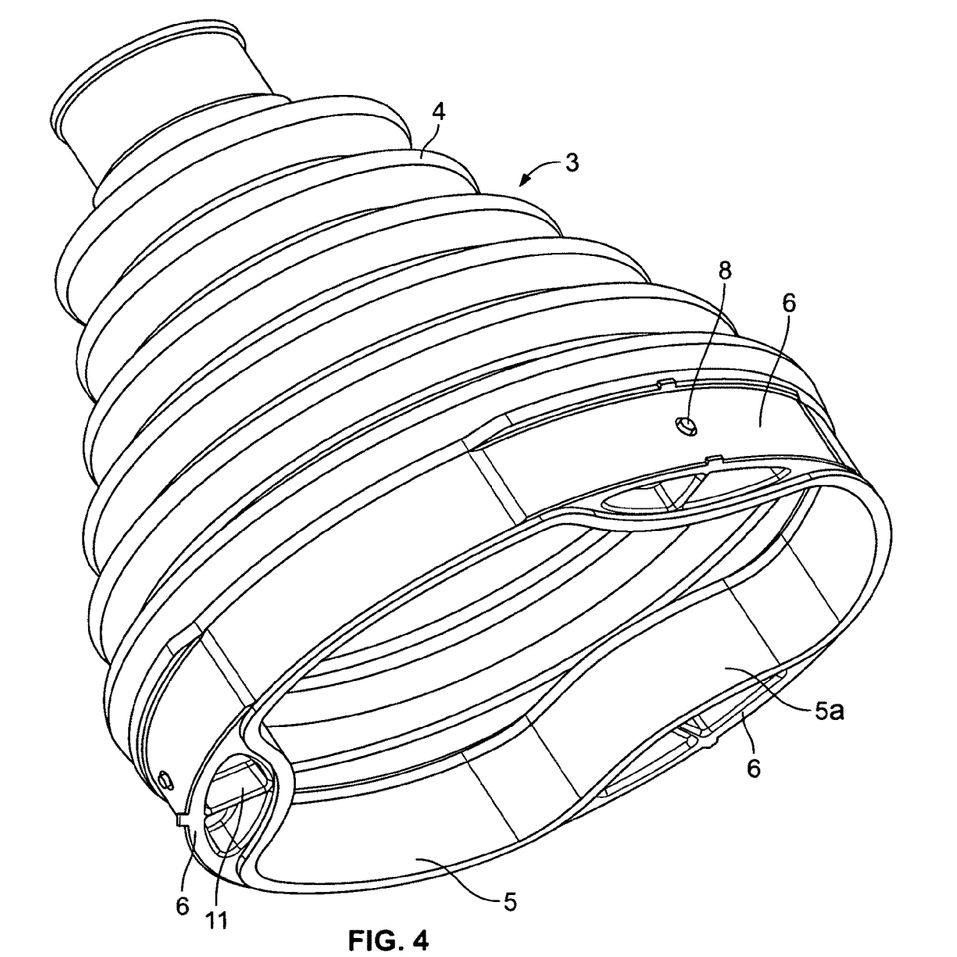
FIG. 4 shows the axle boot of FIG. 3 with compensating pieces attached to it.

FIG. 1 shows a joint housing 1 made of metal for a joint in the drive train of a motor vehicle. The external contour of joint housing 1 includes a plurality of radial recesses 2—three of them in the exemplary embodiment shown in the figure. An axle boot 3 made of a thermoplastic copolyester (TPE) includes an axisymmetric bellows 4 and is used to seal off the joint in the drive train of the motor vehicle.

A connecting collar 5 of axle boot 3 is designed as a single piece with bellows 4. Connecting collar 5 includes a plurality of indentations 5a projecting towards the inside that are adapted to radial recesses 2 in the external contour of joint housing 1.

A plurality of compensating pieces 6—three in the exemplary embodiment shown in the figure—are attached to the outside of connecting collar 5, in each case on the outside of indentations 5a. Compensating pieces 6 complete the external contour of connecting collar 5, forming a cylindrical circumferential surface around which a metal or plastic clamp 7 is clamped in order to press connecting collar 5 against the external surface of joint housing 1, thereby forming a seal.

In the exemplary embodiment shown in FIGS. 1 through 4, the three single compensating pieces 6 are connected to clamp 7 by rivets 8, for example.

Figure 5:
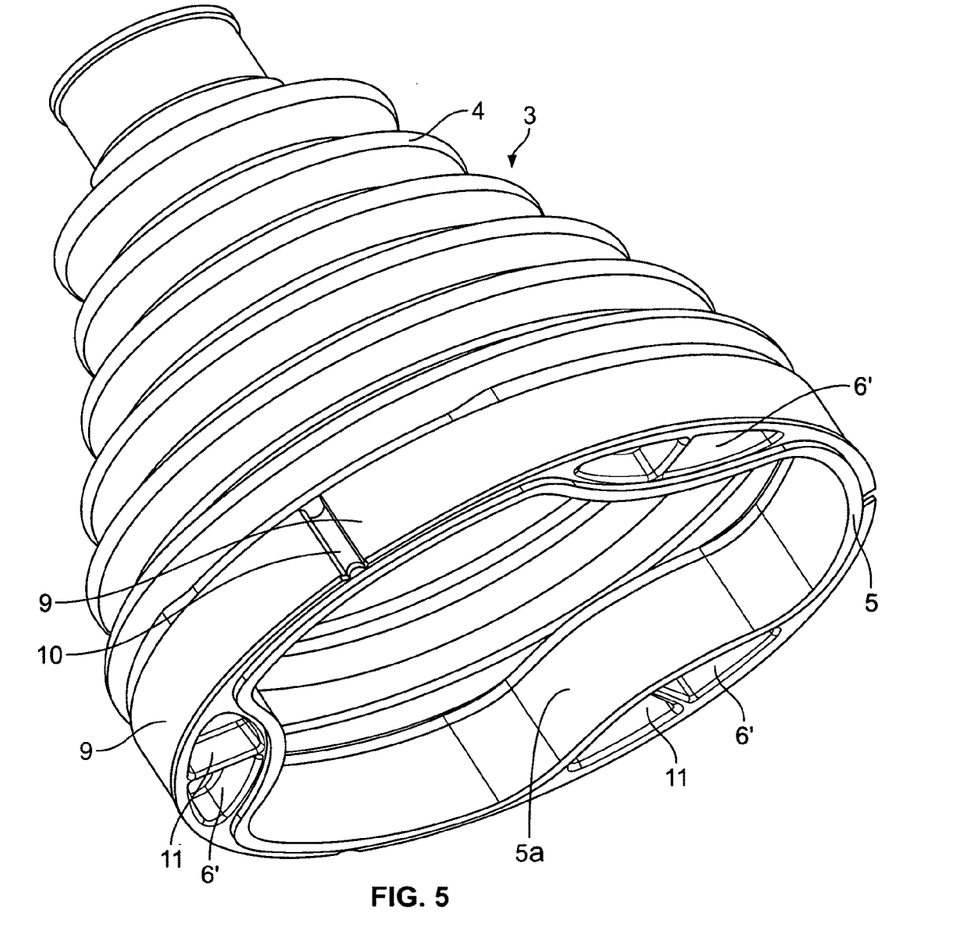
FIG. 5 shows the axle boot of FIG. 3 with compensating pieces that are connected to one another annularly.
Figure 6:
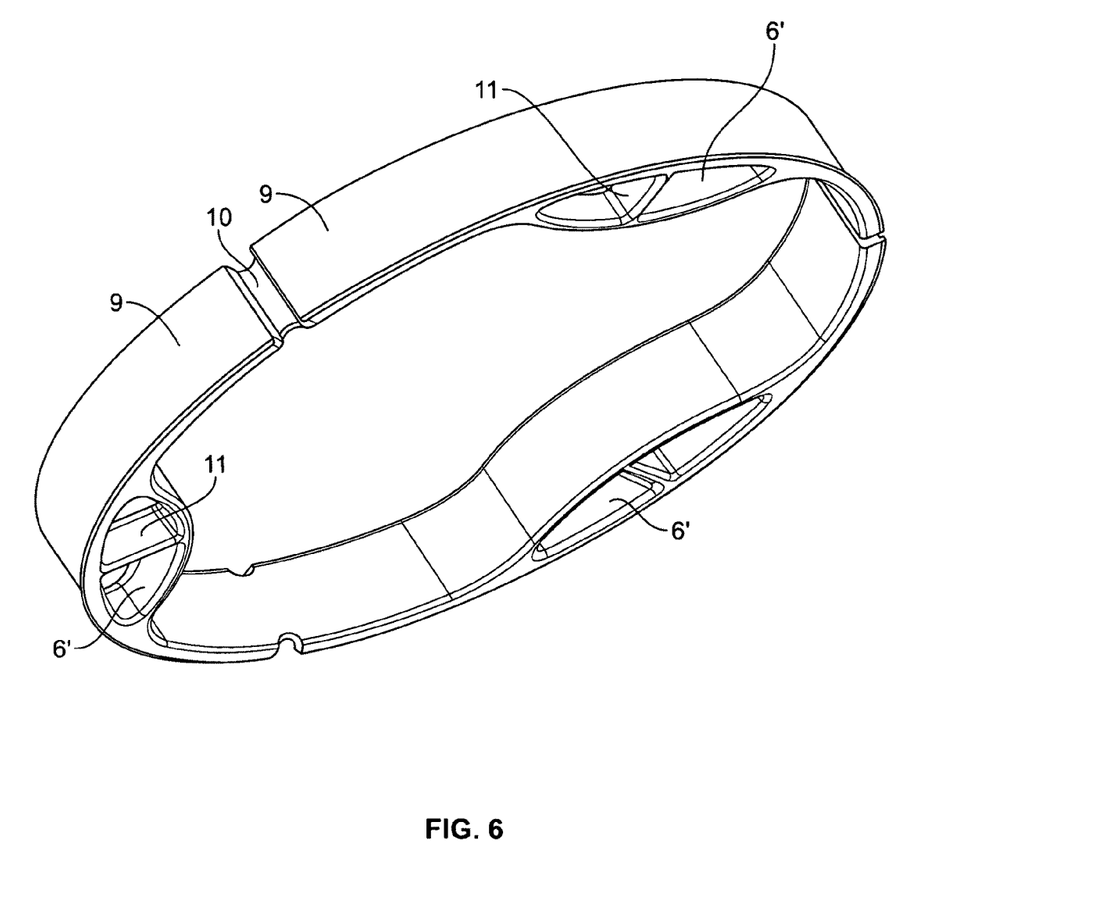
FIG. 6 shows the compensating pieces of FIG. 5 that are connected to one another annularly.

In a design that differs from that, compensating pieces 6' in the exemplary embodiment shown in FIGS. 5 and 6 are connected by ring sections 9 and bending joints 10 to form a single-piece component (FIG. 6) that extends around the entire circumference of connecting collar 5.

Figure 7:
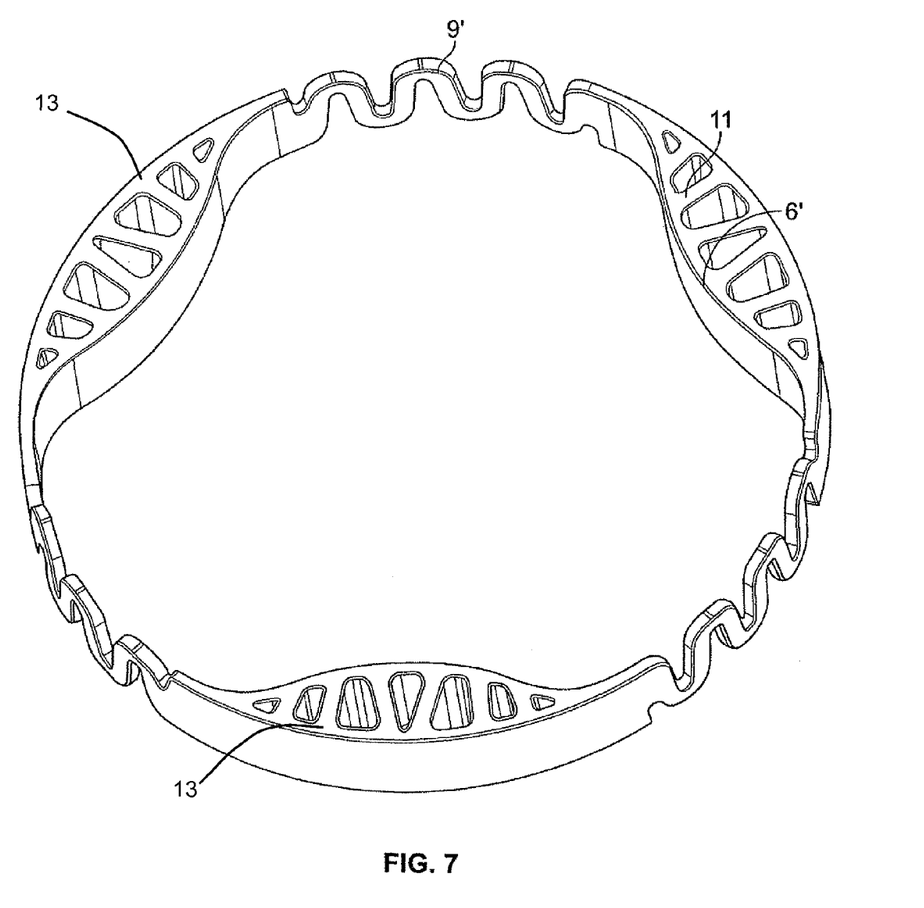
FIG. 7 shows the compensating pieces of FIGS. 5 and 6 that are connected to one another annularly, whereby the ring sections that connect the compensating pieces are designed in the shape of a meander.

In a design that differs from FIG. 6, compensating pieces 6' in the exemplary embodiment shown in FIG. 7 are connected by ring sections 9' that are designed in the shape of a meander to form a single-piece component that extends around the entire circumference of connecting collar 5. An advantageous feature of this design is the fact that the compensating pieces that are adjacent to one another in the circumferential direction are connected by ring sections that are designed to be elastically yielding in the circumferential direction. The ring, including compensating pieces 6 and 6' and ring sections 9 and 9', may compensate for the positive and negative circumferential changes that occur during assembly, without fracture and with a low required forming force.

In a design that differs from the exemplary embodiments shown in the figures, compensating pieces 6 may also be designed together with clamp 7 as an integrated multi-component unit.

In the exemplary embodiments shown in the figures, compensating pieces 6 and 6' each include a radial supporting web 11 that is used for transferring the clamping force from clamp 7 to connecting collar 5. In a different design, as shown in FIG. 7, a plurality of supporting webs 11 may also transfer the clamping force in a lattice-type structure 13. In addition, the compensating pieces may also be fluid-filled hollow bodies with flexible walls. It is also possible to design the compensating pieces as multi-component units made of material components of different hardnesses in order to achieve a very homogeneous pressure distribution between connecting collar 5 and joint housing 1. The possible design of the compensating pieces in the form of multi-component units made of material components of different hardnesses serves the same purpose.

What is claimed is:

1. An axle boot for joint sealing, comprising:
a joint housing including an external contour having a plurality of radial recesses;
a substantially axisymmetric bellows including an integral connecting collar formed as a single piece, the connecting collar including a plurality of indentations projecting radially inward each indentation adapted to one of the radial recesses; and
a plurality of compensating pieces connected to one another by a plurality of ring sections to form a single piece component surrounding an outer circumference of the connecting collar, the single piece component having a cylindrical outer circumferential surface, at least one of the ring sections being elastically deformable sufficient to enable the single piece component to expand to a circumference larger than the outer circumference of the connecting collar, at least one of the ring sections including a meander shape.

2. The axle boot as recited in claim 1, wherein the axle boot is for sealing a joint on a drive train of a motor vehicle.

3. The axle boot as recited in claim 1, wherein a circumferential length of each of the plurality of compensating pieces corresponds approximately to a circumferential length of an associated radial recess.

4. The axle boot as recited in claim 1, further comprising a circumferential clamp for the connecting collar, the compensating pieces connected to the circumferential clamp.

5. The axle boot as recited in claim 1, wherein each compensating piece includes a more than one material component, each of the material components having a different hardness.

6. The axle boot as recited in claim 1, wherein each of the compensating pieces is a fluid-filled hollow body having flexible walls.

7. The axle boot as recited in claim 1, wherein the bellows is made of athermoplastic copolyester (TPE).

8. An axle boot for joint sealing, comprising:
a joint housing including an external contour having a plurality of radial recesses;
a substantially axisymmetric bellows including an integral connecting collar formed as a single piece, the connecting collar including a plurality of indentations projecting radially inward each indentation adapted to one of the radial recesses;
a plurality of compensating pieces disposed adjacent to an outer surface of the connecting collar so as to form a cylindrical outer circumferential surface, each compensating piece integrally formed and including a radial supporting web, and each compensating piece having a plurality of webs of lattice-type structure;
wherein the plurality of compensating pieces are connected to one another by a plurality of ring sections to form a single piece component surrounding the cylindrical outer circumferential surface of the connecting collar, and wherein at least one of the ring sections includes a meander shape; and
a circumferential clamp disposed adjacent an outer surface of the connecting pieces, wherein the connecting pieces are connected to the clamp as an integral multi-component unit.

9. The axle boot as recited in claim 8, wherein the axle boot is for sealing a joint on a drive train of a motor vehicle.

10. The axle boot as recited in claim 8, wherein a circumferential length of each of the plurality of compensating pieces corresponds approximately to a circumferential length of an associated radial recess.

11. The axle boot as recited in claim 8, wherein each compensating piece includes more than one material component, each of the material components having a different hardness.

12. The axle boot as recited in claim 8, wherein each of the compensating pieces is a fluid-filled hollow body having flexible walls.

13. The axle boot as recited in claim 8, wherein the bellows are made of a thermoplastic coplyester (TPE).

14. An axle boot for joint sealing, comprising:
a joint housing including an external contour having a plurality of radial recesses;
a substantially axisymmetric bellows including an integral connecting collar fanned as a single piece, the connecting collar including a plurality of indentations projecting radially inward each indentation adapted to one of the radial recesses;
a plurality of compensating pieces connected to one another by a plurality of ring sections to form a single piece component surrounding an outer circumference of the connecting collar, the single piece component having a cylindrical outer circumferential surface, each compensating piece having a plurality of webs of a lattice-type structure; and wherein at least one of the ring sections includes a meander shape.

15. The axle boot as recited in claim 14, wherein each of the compensating pieces is a fluid-filled hollow body having flexible walls.

16. The axle boot as recited in claim 14, wherein each compensating piece include a more than one material component, each of the material components having a different hardness.

17. The axle boot as recited in claim 14, wherein the axle boot is for sealing a joint on a drive train of a motor vehicle.

18. The axle boot as recited in claim 14, wherein a circumferential length of each of the plurality of compensating pieces corresponds approximately to a circumferential length of an associated radial recess.

19. The axle boot as recited in claim 14, wherein at least one of the ring sections is elastically deformable in the circumferential direction.

\* \* \* \* \*